March 30, 1937.  E. DODD  2,075,275

PLOW

Filed April 7, 1936  2 Sheets-Sheet 1

Inventor;
Ernest Dodd
Per Leland S. Mitchell
Attorney.

March 30, 1937.  E. DODD  2,075,275
PLOW
Filed April 7, 1936   2 Sheets-Sheet 2
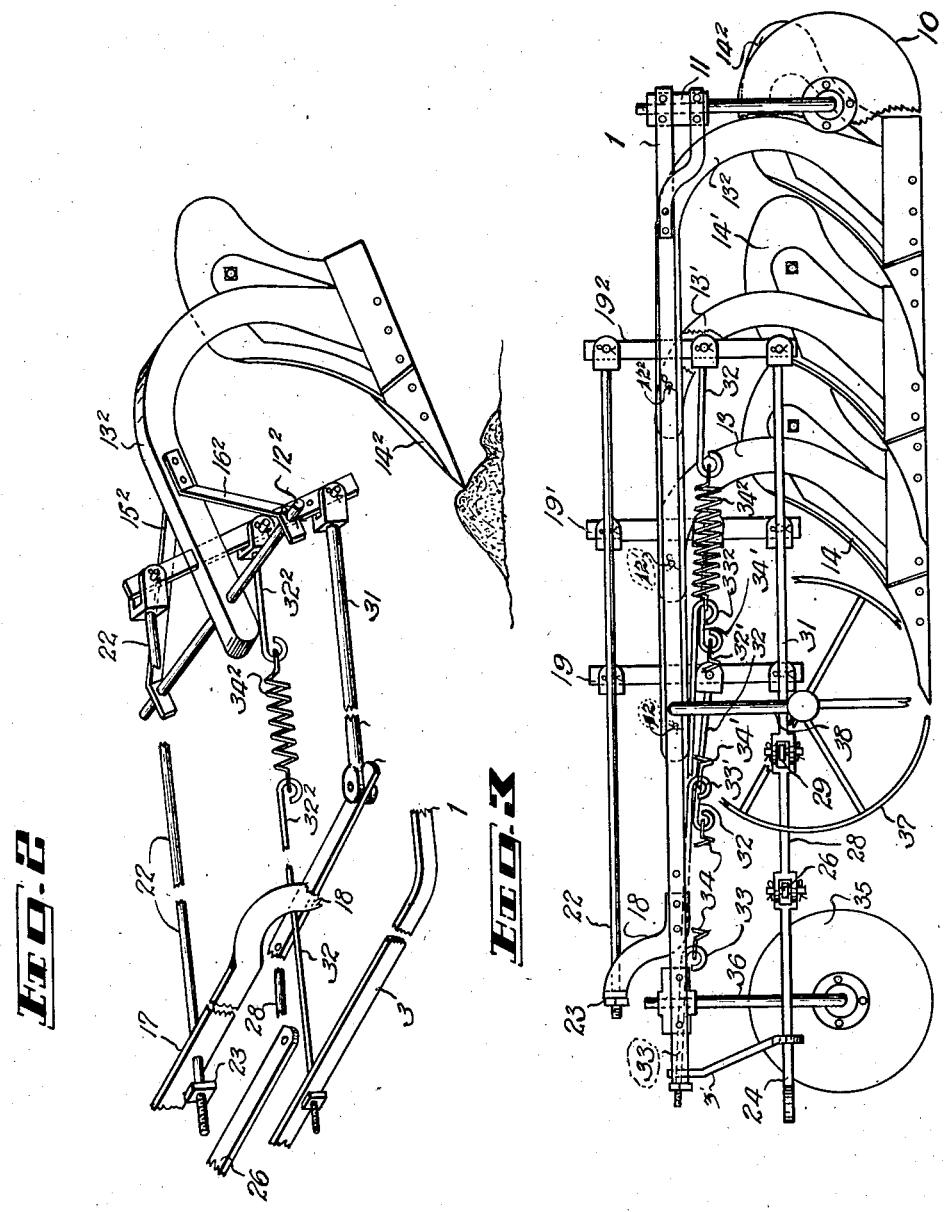
Inventor:
Ernest Dodd
Per Leland S. Mitchell
Attorney.

Patented Mar. 30, 1937

2,075,275

UNITED STATES PATENT OFFICE 2,075,275

PLOW

Ernest Dodd, Winter, Saskatchewan, Canada

Application April 7, 1936, Serial No. 73,131
In Canada April 11, 1935

7 Claims. (Cl. 97—98)

My invention relates to agricultural implements, more particularly having reference to plows and similar implements employing soil working elements.

One of the objects of my invention is to provide a plow or similar device for soil working, cultivating or like agricultural pursuits, wherein the soil working elements are pivotally mounted to swing vertically. The elements are normally constrained to travel in soil working relationship with the ground by spring means and by the draft connection, there being a fixed limitation to the swing in the one direction opposed to the draft connection. By this means the soil working elements are permitted to automatically disengage from an obstruction encountered in the ground without undue strain on the equipment.

An additional feature of the invention lies in the working association of elements by means of draft equalizers that serve to minimize the strain on the draft connection during disengagement of an element.

The invention contemplates provision of one or more soil working elements of a character employing a beam or standard for carrying the element, and a mounting for the beam by which the same may be movable to swing vertically to allow the soil working elements to pass over or disengage from rocks and other obstructions to be encountered in the ground. Adjustable means are provided imposing a fixed resistance to the penetration of the element into the ground and to the draft attachment, the pitch being variable by the adjustment provided.

The draft appliance for the device is attached in opposing relation to the fixed resistance and in conjunction with the spring means serves to constrain the element to normally travel in a soil working position. On encountering an obstruction said element gives to avoid or disengage therefrom against the resistance of the draft and spring means and is restored thereby to its normal position on release from the obstruction.

The device further avoids the necessity for use of a release hitch in implements of this character.

To the accomplishment of the above ends there is provided the novel construction and arrangement of parts as hereinafter more fully described and claimed, reference being had to the accompanying drawings wherein like characters of reference indicate like parts throughout the several views and wherein:—

Fig. 2 is a somewhat diagrammatic perspective view illustrative of the action of an element on encountering an obstruction, certain parts being shown broken away for convenience of illustration.

Fig. 3 is a side view of the implement shown with certain minor parts broken away.

Figure 1:
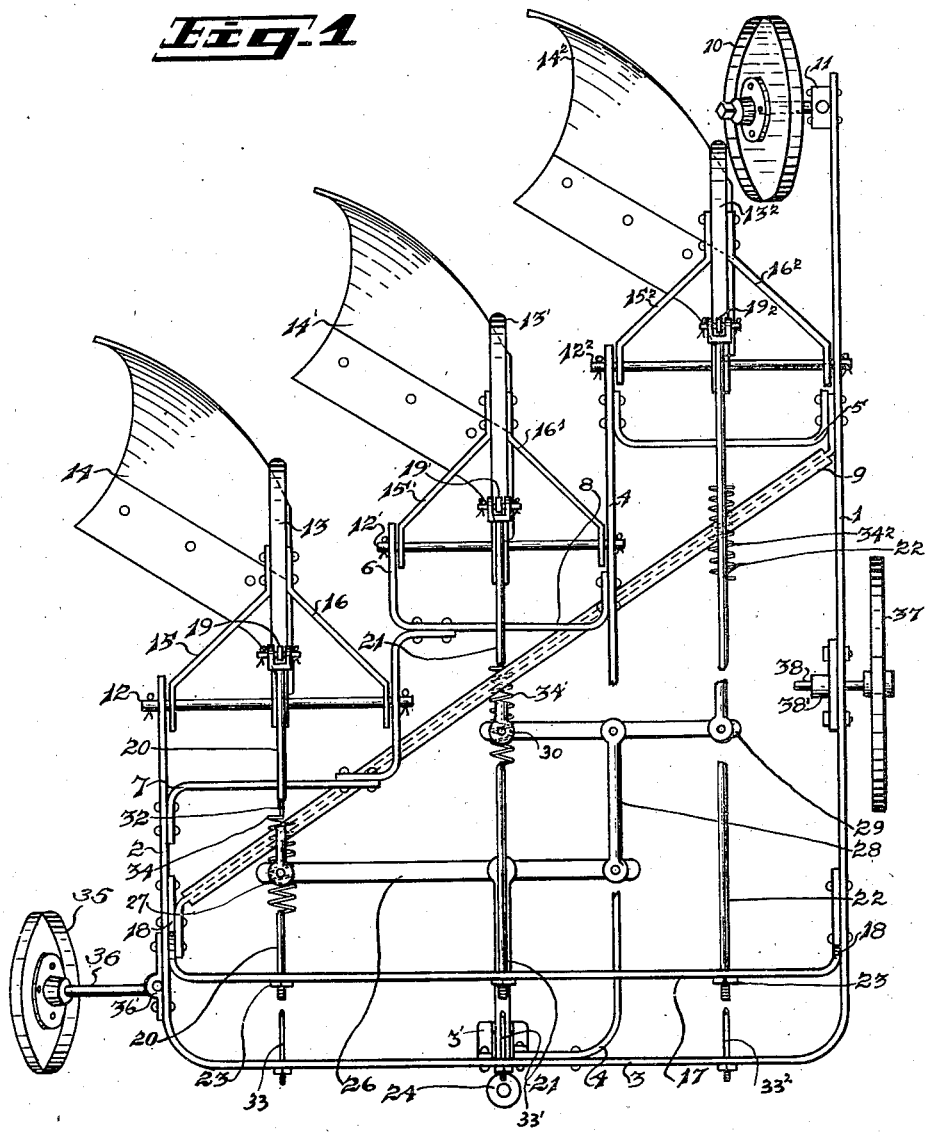
Fig. 1 is a plan view of an implement providing an assembly of elements embodying therein my improvements.

Having reference to the drawings there is provided a frame including main side bars 1 and 2 with forward integral end bar 3. In parallel spaced relation to the bar 1 is an abbreviated intermediate bar 4 forwardly attached to the end bar 3 and rearwardly secured by a cross member 5 to the bar 1.

Intermediately spaced between the side bar 2 and intermediate bar 4 is a further bar 6 that includes an integral section 8 attached to the bar 4. There is further provided an angular bar 7 secured between the bars 2 and 6. This may be constructed of a single piece of material or in sections as illustrated. The whole arrangement is braced by a diagonal brace member 9 and is designed to form a unitary frame structure.

Rearwardly the frame carries a furrow wheel 10 on a suitable axle mounted in a block 11, said block being secured to the frame bar 1.

Forwardly the frame is supported on rotatable elements including a landside wheel 37 with axle 38 journalled in a bearing bracket 38' attached to the frame bar 1. On the furrow side a wheel 35 is provided rotatable on a bent axle 36 mounted in a block 36' secured to the frame bar 2.

The frame structure is designed to mount a series of associated units embodying soil working elements, an arrangement of three being disclosed in the present showing, it being understood the number of units may vary as desired.

The first of such units comprises a transverse rod 12 mounted in the side bar 2 and angular bar 7. On the rod 12 is pivoted the beam 13 of a soil working element 14, said beam being braced against the lateral sway normally encountered by diagonal brace members 15 and 16, said members having their forward ends loosely attached to the rod 12 to pivot with the beam.

Similar units to the foregoing are indicated by like numerals with distinguishing indices.

The side bars 1 and 2 carry an elevated transverse bar 17 on brackets 18—18 suitably secured to said side bars, said brackets in the present showing being integral bent ends of the bar 17.

In each of the beams 13, 13' and 13² is secured or integrally cast therewith, a vertical member or draw bar respectively indicated for the several beams as 19, 19' and 19². The upper ends of said draw bars have secured thereto rods 20, 21 and 22, said rods being forwardly mounted slidable in suitable openings in the transverse bar 17. The ends of the rod are threaded for the reception of nuts 23. Said rods impose a fixed resistance to the downward movement of the soil working units without interference with the upward movement of the units by virtue of the sliding engagement of the rods with the bar 17. Adjustment of the permissible pitch of the soil working elements is possible by manipulation of the nuts 23.

The draft attachment for the device includes a draw bar 24, said draw bar being forwardly suspended in a bracket 3' attached to the forward bar 3. The draw bar attaches to an equalizer 26, the one end of which connects by a rod 27 to the lower end of vertical draw bar 19.

To the opposite end of equalizer 26 is attached by a draft connection 28, a further equalizer 29 with a rod 30 connecting one end thereof to the lower end of vertical draw bar 19' and a rod 31 connecting the other end to vertical draw bar 19².

The lower parts of the vertical draw bars have spring tension means applied to maintain the soil working elements in normal working relation to the ground, and further relieve or cushion the strain on the draft connection when an obstruction is encountered by any one or more of said elements. For the draw bar 19 there are provided links 32 and 33 with interposed connected spring 34, said links being respectively attached to the forward frame bar 3 and lower portion of the draw bar. A similar arrangement indicated by indice bearing numerals being provided for the draw bars 19' and 19².

In the operation of the device, when a soil working element encounters an obstruction, such as indicated in Figure 2, the beam is permitted to pivot against the tension of spring 34² and draft connection, allowing the element to clear the obstruction without liability of breakage, the element being restored to its working position by the action of the spring and draft connection. Obviously the neutralizing effect of a multiple draft connection is important when a strain is imposed by an obstruction.

No release hitch is required with the device when stones, stumps or other obstructions are encountered and the liability of breakage is reduced to a minimum.

It is thought that the many advantages of an attachment in accordance with this invention can be understood, and although the preferred embodiment of the invention is as illustrated and described, yet it is to be understood that changes in the details of construction can be made which will fall within the scope of the invention as claimed.

What I claim is:—

1. In a device of the character described a frame structure, a soil working unit including a beam pivotally mounted in the frame structure, a vertical draw bar carried by the beam, a rod connecting the upper end of the draw bar to the frame structure, said rod being slidably connected to the frame structure, and a draft connection to the lower end of the draw bar operative for constraining the unit to move in working relation to the ground.

2. In a device of the character described a frame structure, a soil working unit including a beam pivotally mounted in the frame structure, a vertical draw bar carried by the beam, a rod forming a sliding connection between the upper end of the draw bar and the frame structure, said connection being adjustable, and said connection opposing a fixed resistance to a downward movement of the soil working unit beyond a predetermined point, a draft connection to the lower end of the draw bar, and a connection between the lower portion of the draw bar and frame structure, said connection including a spring adapted in co-operation with the draft connection for constraining the soil working unit to move in working relation to the ground.

3. In a device of the character described including a frame structure and one or more soil working units, each of said units including a beam pivotally mounted in the frame structure to permit an upward swinging movement of the unit, draw bars carried by said beams, said draw bars projecting above and below the beams, a draft connection to the lower part of each of said draw bars, said connection being adapted to normally constrain the unit to move in working relation to the ground, and means connected to the upper part of each of the draw bars for opposing a fixed resistance to the draft connection at a predetermined point in the pivotal movement of the unit.

4. A device as defined in claim 3 wherein the fixed resistance for each of said units is in the form of a rod having a fixed connection to the upper end of the draw bar and a sliding connection in the frame structure, said sliding connection being adapted to permit an upward pivotal movement of the unit and to impart a limitation on the downward pivotal movement of the unit.

5. In a device of the character described, a frame structure, a series of soil working units mounted in the frame structure pivoted to swing vertically, each of said units including a vertical draw bar, a draft attachment including equalizers with connections to the lower parts of each of said draw bars, spring means applied to each of said units constraining said units to normally travel in working relation to the ground, and means opposing a fixed resistance to movement of the units by the draft connections at predetermined points in the pivotal movements of each of said units.

6. A device of the character described including a frame, a soil working unit mounted in the frame, said unit including a beam and a transverse rod secured to the beam and mounted in the frame by which the unit may swing vertically, a vertical draw bar carried by the unit, a draft connection to the lower part of the draw bar, and means forming a connection between the upper part of the draw bar and frame, said means offering a fixed resistance to the draft connection at a predetermined point in the pivotal movement of the unit.

7. A device as defined in claim 6 including a connection between the lower part of the draw bar and frame with spring means incorporated therein, said spring means being tensioned to co-operate with the draft connection in constraining the unit to move in working relation with the ground.

ERNEST DODD.